April 7, 1925.

1,532,692

J. GEIGER

APPARATUS FOR INDICATING AND REGISTERING THE STROKE AVERAGE OF
THE PISTON PRESSURE IN PRIME MOVERS, PUMPS, OR COMPRESSORS

Filed Dec. 8, 1924

INVENTOR
Josef Geiger
BY J. Sokol
ATTORNEY

Patented Apr. 7, 1925.

1,532,692

UNITED STATES PATENT OFFICE.

JOSEF GEIGER, OF AUGSBURG, GERMANY.

APPARATUS FOR INDICATING AND REGISTERING THE STROKE AVERAGE OF THE PISTON PRESSURE IN PRIME MOVERS, PUMPS, OR COMPRESSORS.

Application filed December 8, 1924. Serial No. 754,677.

*To all whom it may concern:*

Be it known that I, JOSEF GEIGER, a citizen of Germany, residing at Augsburg, Germany, 22 Biermannstrasse, have invented a certain new and useful Improvement in Apparatus for Indicating and Registering the Stroke Average of the Piston Pressure in Prime Movers, Pumps, or Compressors, of which the following is a specification.

The present invention relates to an improved apparatus for determining, indicating and registering the stroke average of the piston pressure, in piston prime movers, pumps and compressors.

Hitherto it has been usual to determine the stroke average of the pressure within the cylinder of a prime mover, pump or compressor by taking several indicator diagrams and computing the mean pressure by integrating for instance by means of a planimeter. This method is very complicated and although it requires a considerable amount of time and great skill on the part of the operator, is not very accurate.

The method forming the subject of the present invention differs fundamentally from the known method and is based on the principle first found by the inventor and verified by experiments that there exists a very simple relation for all piston engines between the stroke average of the pressure or the mean stroke pressure as hitherto determined by means of the usual indicator diagrams hereinafter designated $p_h$, and the time-average of the pressure hereinafter designated as $p_z$. The inventor has found that $p_h = a \ (p_z - b)$ and in a very considerable number of cases the equation is even simpler, namely, $p_h = c$. $p_z$, $a$, $b$ and $c$ being constants dependent on the particular working process or cycle and the type of the engine, but independent of the load. For a particular engine it is, therefore, sufficient to determine once for all the constants $a$ and $b$ or $c$ in order to be able to determine the stroke-average of the pressure from the time-average. The simple relation given above is practically uninfluenced by ordinary irregularities in the operation of the engine. In cases in which the irregularities of the working of the engine are very considerable, for instance, in even pressure Diesel engines having constant compression, the factor $b$ or $c$ varies between very early pre-ignition and very slow combustion conditions merely by about 5%.

In order to determine first the time-average $p_z$, a member such as a piston, diaphragm or the like subjected to the varying fluid pressure is caused to act upon an inertia mass such as a fly disc, either the inertia mass or the fluid controlled member being controlled by a spring at one end connected to a stationary point or casing. The spring and the dimensions of the inertia mass must be chosen so as to cause the inertia mass to assume a position corresponding to the time-average or mean pressure on a time basis $p_z$ notwithstanding the rapid changes of the fluid pressure. This will as a rule be the case if the period of the free oscillations of the instrument is properly chosen in relation to the lowest numbers of oscillations of the fluid pressure. A pointer connected to the inertia mass either directly or through a suitable transmission gear, will then indicate directly $p_z$ upon a suitable scale. The scale may be also so arranged as to enable $p_h$ to be read directly. It is immaterial for the purpose of the invention how the inertia mass and the spring device are constructed or arranged so long as the conditions mentioned are fulfilled. The inertia mass and the spring devices need not necessarily be constituted by solid bodies.

The accompanying drawings show by way of example an instrument suitable for indicating and recording the stroke-average.

Figure 1:
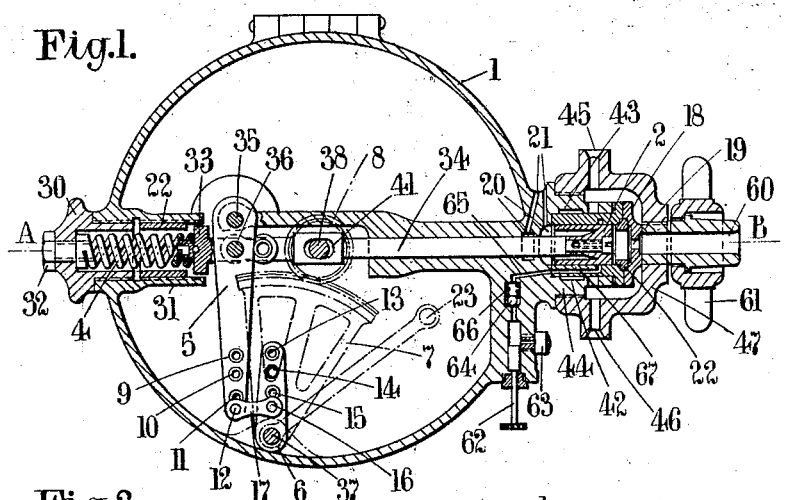
Fig. 1 is a sectional elevation.
Figure 2:
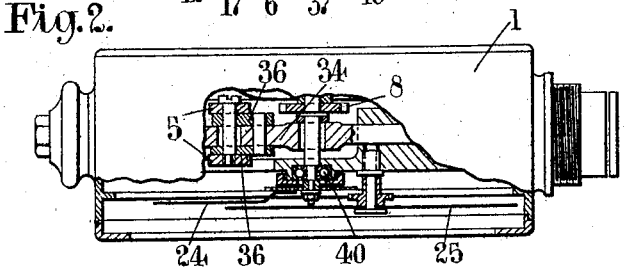
Fig. 2 is a horizontal section on line A—B of Fig. 1.
Figure 3:
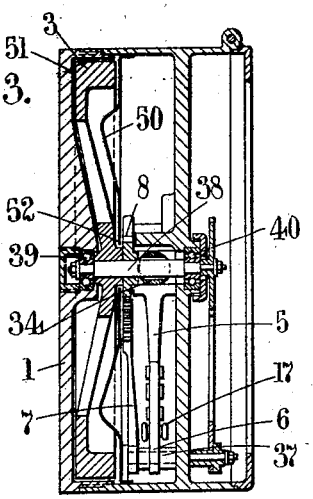
Fig. 3 is an end view, partly in section.

The piston 2 which is subjected to the fluid pressure in the cylinder of the engine is operatively connected by a toothed gear and a lever transmission mechanism to an inertia mass constituted by the fly wheel 3, and is normally held in a certain position of equilibrium by a spring 4. The spring may be a double wound cylindrical spiral spring of the kind used in pressure indicators and is preferably mounted in a cap 30 screwed into the casing 1, and in a tubular portion 31 of said casing, one end of the spring is fixed to the cap by a screw 32. The other end is fixed to and acts upon the enlarged end 33 of the piston rod 34 of the piston 2. It will be seen that the spring 4 may be easily exchanged by unscrewing the cap 30. The spring takes up directly the mean fluid pressure so that only the oscillations of the fluid pressure are transmitted through the toothed gear and lever mechanism to the inertia mass or fly wheel. The central arrangement of the spring tends to reduce friction and increases the accuracy of the instrument.

In order to reduce as far as possible the dimensions and weight of the inertia mass, the movement of the piston is very considerably increased, the transmission ratio from the piston to the fly-wheel being at least 25. In the construction shown the transmission gear comprises the lever 5 pivoted in the casing at 35 and connected to the piston rod 34 by links 36. The lever 5 is operatively connected by a link 17 to a lever 6 secured to a shaft 37. Upon the shaft 37 is fixedly mounted a toothed segment 7 meshing with a pinion 8 fast to the shaft 38 carrying the fly-wheel 3. The shaft 38 is carried in the casing by means of ball bearings 39 and 40. The shaft 38 passes through an elongated slot 41 of the piston rod 34.

To enable the instrument to be used for piston engines of different kinds having different relations between the stroke-average and the time-average pressures, means are provided in addition to the exchangeability of the spring 4, for altering the gear ratio of the transmitting device interposed between the fluid controlled member and the inertia mass. For this purpose the two co-operating levers 5 and 6 are each provided with a number of holes 9, 10, 11, 12 and 13, 14, 15, 16 respectively placed in such a manner that by changing the position of the link 17 the speed increase of the gear may be varied within certain limits. There is no need to exchange any parts and the link 17 may be so constructed that it may be taken out of say holes 12, 16 and inserted forthwith into two other corresponding holes, say 9 and 13.

In order to enable the pointer to assume rapidly a new position of equilibrium corresponding to a change of load, that is, in order to reduce the number of oscillations preceding the taking up of a new position by the pointer, the gap or clearance 51 between the fly wheel 3 and the casing 1 is made as small as possible. This gap or clearance may, if required, be filled with oil to increase the damping effect by the capillary forces acting upon the fly wheel. A partition 50 having an oil-tight joint with the hub 52 of the fly wheel may be provided if required, and the chamber in which the fly wheel is located may then be entirely filled with oil.

It may be pointed out that the instrument need not and should not as a rule be connected directly to the cylinder of the prime mover, but may be placed at a suitable distance from the cylinder at a point less subjected to vibration and more suitable for observation. The instrument may, for instance, be placed near the engineer's station and may then be connected by a flexible pipe of very small diameter with the interior of the cylinder of the prime mover.

In cases in which the working medium of the prime mover or piston engine is a hot gas of combustion, it is advisable to provide an easily exchangeable connection member 18 between the cylindrical sleeve 42 in which the piston works and the flexible tube (not shown) leading to the engine cylinder. This connection member 18 is provided with one or more holes 19 by which the hot combustion gases are divided and deflected away from the contact surfaces of the piston 2 and the cylindrical sleeve 42.

Another object of the provision of the hole or holes 19 is to avoid or reduce the deposit of carbon or other solid matter upon the surface of contact. In some cases it is quite sufficient to provide one small central hole 19 in the connection piece 18. If required, several baffle plates might be provided having passages arranged in staggered relation.

In view of the fact that one side of the piston is continuously exposed to high fluid pressure whilst the other side is exposed only to the ordinary air pressure, the lubrication of the contact surface between the piston and the cylinder presents some difficulty inasmuch as the lubricant is gradually forced out by the fluid pressure. On the other hand it is important to avoid the piston running dry as this would increase the friction to such an extent as to impair the proper operation of the instrument. These drawbacks may, according to the invention, be avoided by supplying continuously and under pressure lubricant to the contact surface at a very low rate. The lubricant pressure oil may as a rule be taken from the pressure oil supply of the engine.

In order to reduce as far as possible the friction between the piston and the cylinder, more particularly when the temperature of the combustion gases is high, means are provided for cooling the cylinder sleeve directly with water upon its entire length. For this purpose a jacket 43 is provided between the cylinder sleeve 42 and a tubular portion 44 of the casing 1 through which water may be circulated by means of pipes attached to the passages 45 and 46 respectively. These passages are provided in a cap 47 screwed upon the tubular portion 44.

In order to prevent any pressure fluid or condensate which might leak through the piston from passing into the interior of the instrument, there are provided annular spaces 20 at the rear of the piston which communicate with the outer air through passages 21. If required, a larger number of such annular spaces and discharge passages may be used.

It may be pointed out that the object of these annular spaces and discharge passages is somewhat different from that of a similar arrangement used in the ordinary indicators, inasmuch as in the ordinary indicators, the annular spaces and discharge passages serve for preventing counter pressure upon the rear side of the cylinder.

It is advisable to limit the play of the pointer to correspond to averages lying within a range extending from no load to full load of the engine. Average pressures below no load are of no interest and need not be indicated by the instrument. In order to avoid or reduce shocks that might occur in the end positions owing to the inertia effect of the fly wheel, there are provided buffers 22 both close to the piston and to the enlarged portion 33 of the piston rod 34. These buffers may consist of tubular members made of a yielding material, and they may, if required, be longitudinally adjustable in order to vary or adjust the range of measure or the play of the pointer.

In order to enable the instrument to be used both for directly indicating average pressure upon an easily readable scale having large divisions, and for permanently registering or recording pressure, without unduly increasing the size of the instrument, means for indicating and registering are provided. A pointer 24 directly connected to the fly wheel serves for the direct reading of the pressure. The registering member 23 is mounted upon the shaft 37, that is, upon an intermediate part of the transmission gear so that its amplitude of oscillation for the same movement of the piston is less than the corresponding oscillation of the pointer 24. The lever 23, which may be provided with a writing point, works upon a circular recording disc 25 which is rotated by any suitable mechanism, for instance, by means of a clockwork arranged within the casing. The clockwork is not shown in the drawing, the arrangement and operation of such clockworks being very well known in the art. The lever 23 should preferably be arranged in such a manner as to move entirely outside the recording disc 25 upon the closing of the connection between the instrument and the fluid pressure pipe so as to enable the record to be rapidly exchanged. It is sufficient for this purpose to make the width of the paper extend only a very small amount beyond the position corresponding to no load and by choosing the lever ratio in such a manner as to place the no-load position of the recording lever outside and the full load position inside the recording disc.

The following formulæ representing the relation between time-average and stroke-average pressures are given by way of example. These formulæ are based on actual tests made with various types of steam and internal combustion engines. In the case of three-cylinder locomotive engines working with superheated steam and triple expansion, the formulæ relating to two different cylinders of the engine were:

$$p_h = 4{,}94 \ (p_z - 2{,}48)$$

and $$p_h = 3{,}7 \ (p_z - 2{,}58)$$

These formulæ were found to be unaffected by the degree of throttling. In the case of gas engines, the relation could in many cases be expressed by the equation:

$$p_h = p_z$$

For Diesel engines and internal combustion engines generally, the relation could be expressed in the case of the two-stroke cycle by the equation:

$$p_h = 4{,}25 \ (p_z - 0{,}0811 \ p_c)$$

and for the four-stroke cycle by the equation:

$$p_h = 8{,}5 \ (p_z - 0{,}0811 p_c).$$

In this formula $p_c$ represents the compression pressure. Thus for a compression pressure of 32 atmospheres and two-stroke cycle $p_h = 4{,}25 \ p_z - 11$.

Similar formulæ may be found for other types of combustion engines.

I claim:

1. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; and a spring member connected to the stationary casing and opposing the actuating member, the elasticity of the spring member being so chosen as to allow the inertia mass to remain at rest during occurring rapid changes of the fluid pressure in the engine, substantially as described.

2. Apparatus for registering the stroke-average of the piston pressure in piston prime movers, pumps and compressors comprising: an actuating member adapted to be controlled by the fluid pressure within the cylinder of the prime mover, pump or compressor, but having no mechanical connection with the piston of the prime mover, pump or compressor; a registering member; a record on which the positions of the registering member may be read directly in terms of the stroke-average of the piston pressure; an inertia mass associated with the registering member; a speed increasing transmission device for transmitting the movement of the actuating member to the inertia mass; a stationary casing; and a spring member connected to the stationary casing and opposing the actuating member, the elasticity of the spring member being so chosen as to allow the inertia mass to remain at rest during occurring rapid changes of the fluid pressure in the engine, substantially as described.

3. Apparatus for indicating the stroke-average of the piston pressure in piston prime movers, pumps or compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means for varying the elasticity of the said spring member, substantially as described.

4. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; means for varying the transmission ratio of said transmission device; a stationary casing; and a spring member connected to the stationary casing and opposing the actuating member, the elasticity of the spring member being so chosen as to allow the inertia mass to remain at rest during occurring rapid changes of the fluid pressure in the engine, substantially as described.

5. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means for damping the movement of the indicating member to a new position of equilibrium corresponding to a change of load, substantially as described.

6. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means of connection for operating the actuating member from a considerable distance, substantially as described.

7. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member, a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means for preventing access of carbon and other solid matter to the said actuating member, substantially as described.

8. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means for cooling the said actuating members, substantially as described.

9. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means for lubricating said actuating member, substantially as described.

10. Apparatus for indicating the stroke-average of the piston pressure in piston prime movers, pumps and compressors comprising: an actuating member adapted to be controlled by the fluid pressure within the cylinder of the prime mover, pump or compressor, but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means provided at the rear of the actuating member for preventing gases or condensate from entering the casing, substantially as described.

11. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means for limiting the movement of the indicating member to a range extending between full load and no load positions.

12. Apparatus for indicating and registering the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; a registering member operatively connected to said actuating member by a part of the said transmission device, and a record on which the positions of the registering members may be read directly in terms of the stroke average of the piston pressure, substantially as described.

13. Apparatus for indicating or registering the stroke average of the piston pressure in piston prime movers, pumps and compressors, comprising: a piston controlled by the fluid pressure within the cylinder of the prime mover, pump or compressor but having no mechanical connection with the piston of the prime mover, pump or compressor, an indicating or registering member operatively connected to said piston; an inertia mass associated with the indicating or registering member; a speed increasing transmission device for transmitting the movement of the piston to the inertia mass; a spring member arranged in the axis of the piston and acting directly upon the piston rod, and a scale or record for reading directly the indication of the indicating or registering member in terms of the stroke-average of the piston pressure, substantially as described.

14. Apparatus for indicating or registering the stroke average of the piston pressure in piston prime movers, pumps or compressors, comprising: an actuating member controlled by the fluid pressure within the cylinder of the prime mover, pump or compressor, but having no mechanical connection with the piston of the prime mover, pump or compressor, an indicating or registering member operated by said actuating member, an inertia mass associated with the indicating or registering member, a spring device opposing the movement of said actuating member, a speed increasing lever mechanism for transmitting the movement of the actuating member to the inertia mass, and an exchangeable transmitting link adapted to be fixed at different distances from the pivots of the levers for altering the gear ratio of the lever mechanism, substantially as described.

15. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; an inertia mass associated with the indicating member; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during occurring rapid changes of the fluid pressure in the engine; and means for damping the oscillations preceding the taking up of a new position by the indicating member, said means consisting of a member adapted to move with friction in an oil bath, substantially as described.

16. Apparatus for indicating or registering the stroke-average of the piston pressure in piston prime movers, pumps or compressors, comprising; a piston controlled by the fluid pressure within the cylinder of the prime mover, pump or compressor, but having no mechanical connection with the piston of the prime mover, pump or compressor; an indicating or registering member, a speed increasing transmission device for transmitting the movement of the piston to the indicating or registering member, an exchangeably mounted cylindrical spiral spring arranged in the axis of the piston and acting directly upon the piston rod; an inertia mass associated with the indicating or registering member; a chamber filled with oil and containing said inertia mass; means for cooling the actuating piston; means for preventing access of foreign matter to the piston; means for discharging to the atmosphere fluid pressure leaking through the piston; and means for lubricating the surface of contact between the piston and the piston cylinder, substantially as described.

17. Apparatus for indicating the stroke-average of the piston pressure in piston prime movers, pumps and compressors comprising: an actuating member adapted to be controlled by the fluid pressure within the cylinder of the prime mover, pump or compressor but having no mechanical connection with the piston of the prime mover, pump or compressor; an indicating member; a scale on which the positions of the indicating member may be read directly in terms of the stroke-average of the piston pressure; a speed increasing transmission device for transmitting the movement of the actuating member to the inertia mass; a stationary casing; a spring member connected to the stationary casing and opposing the actuating member, the elasticity of the spring member being so chosen as to allow the inertia mass to remain at rest during the occurring rapid changes of the fluid pressure in the engine; and adjustable stops made of yielding material for limiting the movement of the actuating member, substantially as described.

In testimony whereof I have hereunto set my hand in the presence of two witnesses.

Dr. JOSEF GEIGER.

Witnesses:
  O. DE SOTO,
  ANNY DENDL.